(12) United States Patent
Wang et al.

(10) Patent No.: US 11,606,709 B2
(45) Date of Patent: Mar. 14, 2023

(54) METHOD FOR CONTROLLING FUNCTION OF TERMINAL DEVICE, TERMINAL DEVICE AND NETWORK DEVICE

(71) Applicant: GUANGDONG OPPO MOBILE TELECOMMUNICATIONS CORP., LTD., Guangdong (CN)

(72) Inventors: Shukun Wang, Guangdong (CN); Ning Yang, Guangdong (CN); Yang Xu, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/336,020

(22) Filed: Jun. 1, 2021

(65) Prior Publication Data
US 2021/0289384 A1  Sep. 16, 2021

Related U.S. Application Data

(63) Continuation of application No. PCT/CN2019/079369, filed on Mar. 22, 2019.

(51) Int. Cl.
*H04W 24/10* (2009.01)
*H04W 8/24* (2009.01)
(Continued)

(52) U.S. Cl.
CPC ............ *H04W 24/10* (2013.01); *H04W 8/24* (2013.01); *H04W 72/0453* (2013.01)

(58) Field of Classification Search
None
See application file for complete search history.

(56) References Cited

U.S. PATENT DOCUMENTS 9,516,135 B2   12/2016  Park
2012/0108199 A1*  5/2012  Wang .................... H04W 4/90
                                                         455/405

(Continued)

FOREIGN PATENT DOCUMENTS

CN   102281568 A   12/2011
CN   103458437 A   12/2013
(Continued)

OTHER PUBLICATIONS

Vivo: "UE Power Consumption Reduction in RRM measurement", 3GPP Draft; R2-1900397_UE Power Consumption Reduction in RRM measurement, vol. RAN WG2, No. Athens, Greece, Feb. 25, 2019-Mar. 1, 2019 Feb. 15, 2019 (Feb. 15, 2019), XP051601791 (Year: 2019).*

(Continued)

*Primary Examiner* — Saba Tsegaye
(74) *Attorney, Agent, or Firm* — Perkins Coie LLP

(57) ABSTRACT

A method for controlling a function of a terminal device, a terminal device and a network device are provided. The method comprises operations as follows. Function configuration information is acquired. The function configuration information is used to instruct the terminal device to activate a target function. Whether to execute the target function that is indicated to be activated in the function configuration information is determined based on a preset condition.

4 Claims, 14 Drawing Sheets

(51) Int. Cl.
H04W 72/04 (2009.01)
H04W 72/0453 (2023.01)

(56) References Cited

U.S. PATENT DOCUMENTS

| 2013/0332567 | A1  | 12/2013 | Park     |           |
|--------------|-----|---------|----------|-----------|
| 2014/0295840 | A1* | 10/2014 | Keskitalo | H04W 24/10 |
|              |     |         |          | 455/436   |
| 2015/0131578 | A1* | 5/2015  | Baek     | H04W 72/0406 |
|              |     |         |          | 370/329   |
| 2017/0311193 | A1* | 10/2017 | Jiang    | H04W 24/10 |
| 2019/0037425 | A1* | 1/2019  | Hong     | H04B 7/06 |
| 2020/0137604 | A1* | 4/2020  | Chen     | H04W 48/20 |
| 2020/0169905 | A1* | 5/2020  | Chen     | H04W 24/10 |
| 2020/0275296 | A1* | 8/2020  | Chen     | H04W 76/28 |

FOREIGN PATENT DOCUMENTS

| CN | 103491127 A | 1/2014 |
| CN | 104012137 A | 8/2014 |
| CN | 106376033 A | 2/2017 |
| CN | 107295493 A | 10/2017 |

OTHER PUBLICATIONS

International Search Report in the international application No. PCT/CN2019/079369, dated Nov. 28, 2019.
Nokia Siemens Networks et al. "Enhancing the MDT Configuration to Enable the Collection of M1 Reports for All Configured RRM Measurement Triggers in MDT to Align With TS 37.320" 3GPP TSG-SA5 Meeting #85 S5-122828, Nov. 2, 2012 (Nov. 2, 2012), section 4.1.1.6 a.
3GPP TS 38.331 V16.2.0 (Sep. 2020), 3rd Generation Partnership Project; Technical Specification Group Radio Access Network; NR; Radio Resource Control (RRC) protocol specification (Release 16).
3GPP TS 38.304 V16.2.0 (Sep. 2020), 3rd Generation Partnership Project; Technical Specification Group Radio Access Network; NR; User Equipment (UE) procedures in Idle mode and RRC Inactive state (Release 16).
Vivo:"UE Power Consumption Reduction in RRM Measurement", 3GPP Draft—R2-1900397; vol. RAN WG2 No. Athens Greece—Feb. 25. 2019-Mar. 1, 2019 Feb. 15, 2019 (Feb. 15, 2019), XP051601791. 5 pages.
Huawei et al:"On RRM optimization in time domain for UE power saving", 3GPP Draft; R2-1900601; vol. RAN NG2 No. Athens Greece—Feb. 25, 2019-Mar. 1, 2019 Feb. 15, 2019 (Feb. 15, 2019), XP051601981. 3 pages.
Ericsson:"Relaxed RRM measurements in Connected mode",3GPP Draft; R2-1901276, 3rd Generation Partnership Project (3GPP), vol. RAN WG2, No. Athens, Greece;—2019030115 Feb. 2019 (Feb. 15, 2019), XP051602635. 2 pages.
Ericsson:"Relaxed RRM measurements in Idle mode",3GPP Draft; R2-1901277; vol. RAN WG2, No. Athens, Greece;—Mar. 1, 2019 Feb. 15, 2019 (Feb. 15, 2019),XP051602636. 3 pages.
Supplementary European Search Report in European application No. 19920895.0, dated Oct. 28, 2021. 10 pages.
First Office Action of the European application No. 19920895.0, dated Apr. 29, 2022. 4 pages.
Office Action of the Indian application No. 202127024459, dated Mar. 8, 2022. 7 pages with English translation.
First Office Action of the Chinese application No. 202110304340.3, dated Jul. 5, 2022. 21 pages with English translation.
Second Office Action of the European application No. 19920895.0, dated Aug. 19, 2022. 6 pages.
Second Office Action of the Chinese application No. 202110304340. 3, dated Oct. 10, 2022. 13 pages with English translation.

* cited by examiner

Second communication unit 51

FIG. 5

METHOD FOR CONTROLLING FUNCTION OF TERMINAL DEVICE, TERMINAL DEVICE AND NETWORK DEVICE

CROSS-REFERENCE TO RELATED APPLICATIONS

This is a continuation application of International Patent Application No. PCT/CN2019/079369, filed on Mar. 22, 2019, the disclosure of which is hereby incorporated by reference in its entirety.

BACKGROUND

For the purpose of energy saving of the terminal device, relax optimization (Radio Resource Management (RRM) relax) is performed on New Radio (NR) RRM. The optimization is mainly used to reduce the number of cells measured by the terminal device, and/or the number of frequency layers. For example, the terminal device reduces the number of cells measured by the terminal device and/or the number of frequency layers according to information of a beam where the terminal device is located. In R16, a network optimization function is introduced in the NR, which allows the terminal device to record information and report to a network side, and assists the network to optimize the network function. These functions, such as minimization of drive test (MDT), are collectively referred to as "network optimization configuration report". The terminal device in the idle mode or inactive mode performs measurement according to the configuration measurement, and report a measurement result to the network side after the terminal device enters the connected mode. Such the function is called "idle measurement report".

However, introduction of these functions will affect a part of the performance of the terminal device. For example, power consumption, performance, memory and so on of the terminal device may be affected.

SUMMARY

The disclosure relates to the technical field of information processing, and particularly to a method for controlling a function of a terminal device, a terminal device, a network device.

In order to solve the above technical problems, the embodiments of the present disclosure provide a method for controlling a function of a terminal device, a terminal device and a network device.

A first aspect of the present disclosure provides a method for controlling a function of a terminal device, applied to the terminal device, which includes the following operations.

Function configuration information is acquired. The function configuration information is used to instruct the terminal device to activate a target function.

Whether to execute the target function that is indicated to be activated in the function configuration information is determined based on a preset condition.

A second aspect of the present disclosure provides a method for controlling a function of a terminal device, applied to a network device, which includes the following operations.

Function configuration information is sent to the terminal device. The function configuration information is used to instruct the terminal device to activate a target function, and whether to execute the target function is determined by the terminal device.

A third aspect of the present disclosure provides a terminal device, including a processor and a memory. The memory is used to store a computer program, and the processor is used to call and execute the computer program stored in the memory to acquire function configuration information, where the function configuration information is used to instruct the terminal device to activate a target function; and determine, based on a preset condition, whether to execute the target function that is indicated to be activated in the function configuration information.

BRIEF DESCRIPTION OF THE DRAWINGS

FIG. 5 is a schematic diagram of a composition structure of a network device according to an embodiment of the present disclosure.

DETAILED DESCRIPTION

In order to understand the characteristics and technical content of the embodiments of the present disclosure in detail, the implementation of the embodiments of the present disclosure is described in detail in combination with the drawings. The drawings are used for reference only rather than defining the embodiments of the present disclosure.

The technical solution in the embodiments of the present disclosure may be described below in conjunction with the drawings in the embodiments of the present disclosure. Apparently, the described embodiments are a part of the embodiments of the present disclosure, rather than all of the embodiments. Based on the embodiments in the disclosure, all other embodiments obtained by those of ordinary skill in the art without making creative work shall fall within the scope of protection in the disclosure.

The technical solution of the embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD), an LTE Time Division Duplex (TDD), a Universal Mobile Telecommunication System (UMTS), a Wordwide Interoperability for Microwave Access (WiMAX) communication system or 5G system, etc.

Figure 1A:
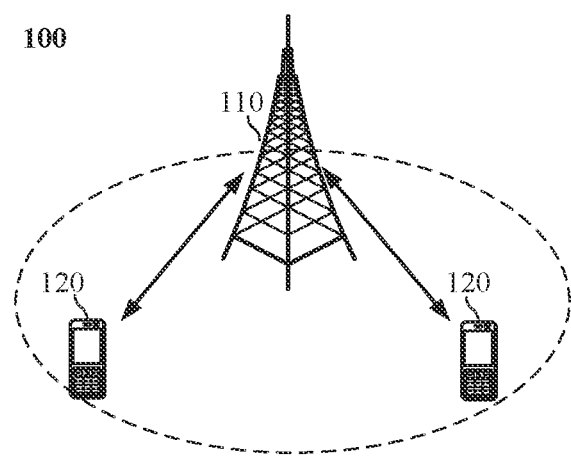
FIG. 1A is a first schematic diagram of architecture of a communication system provided according to an embodiment of the present disclosure.
Figure 1B:
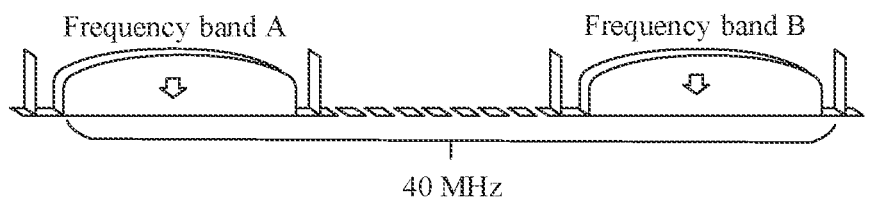
FIG. 1B is a schematic diagram of carrier aggregation.
Figure 1C:
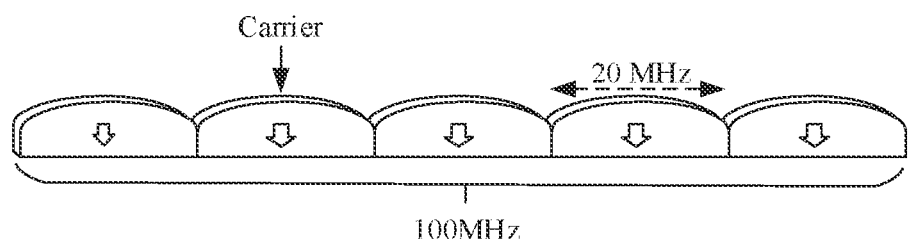
FIG. 1C is a schematic diagram of carrier aggregation

Exemplarily, the communication system 100 to which the embodiments of the present disclosure are applied may be as shown in FIG. 1A. The communication system 100 may include a network device 110, and the network device 100 may communicate with a terminal device 120 (or referred to as a communication terminal or a terminal). The network device 110 may provide communication coverage for a specific geographic area and may communicate with a terminal device located within the coverage area. Optionally, the network device 110 may be a network device (Base Transceiver Station (BTS)) in a GSM system or a CDMA system, a network device (NodeB (NB)) in a WCDMA system, an evolutional network device (Evolutional Node B, eNB or eNodeB) in an LTE system or a wireless controller in a Cloud Radio Access Network (CRAN). Alternatively, the network device may be a mobile switch center, a relay station, an access point, vehicle equipment, wearable equipment, hubs, switches, bridges, routers, a network side device in 5G networks, or a network device in the future evolutional Public Land Mobile Network (PLMN), etc.

The communication system 100 further includes at least one terminal device 120 within the coverage area of the network device 110. The terminal device as used herein includes, but is not limited to being connected via a wired line, such as a Public Switched Telephone Networks (PSTN), a Digital Subscriber Line (DSL), a digital cable, and a direct cable, and/or another data connection/network, and/or a wireless interface, such as a cellular network, a wireless local area network (WLAN), a digital TV network such as a DVB-H network, a satellite network, an AM-FM broadcast transmitter, and/or another terminal device that is configured to receive/send a communication signal, and/or Internet of Things (IoT) equipment. A terminal device configured to communicate through a wireless interface may be referred to as "a wireless communication terminal", "a wireless terminal" or "a mobile terminal".

Optionally, Device to Device (D2D) communication may be performed between terminal devices 120.

Optionally, a 5G system or a 5G network may also be referred to as a New Radio (NR) system or a NR network.

Figure 1D:
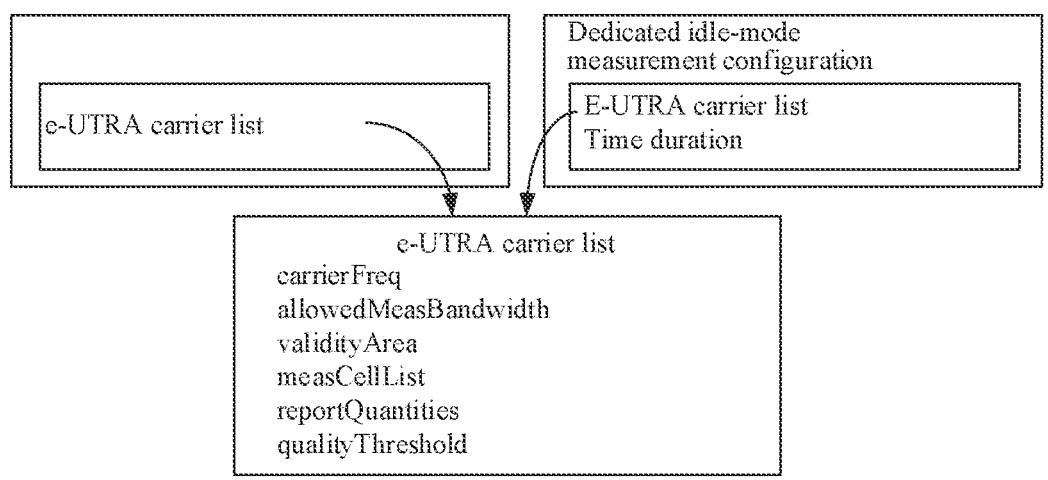
FIG. 1D is a schematic diagram of idle-mode measurement configuration information.
Figure 1E:
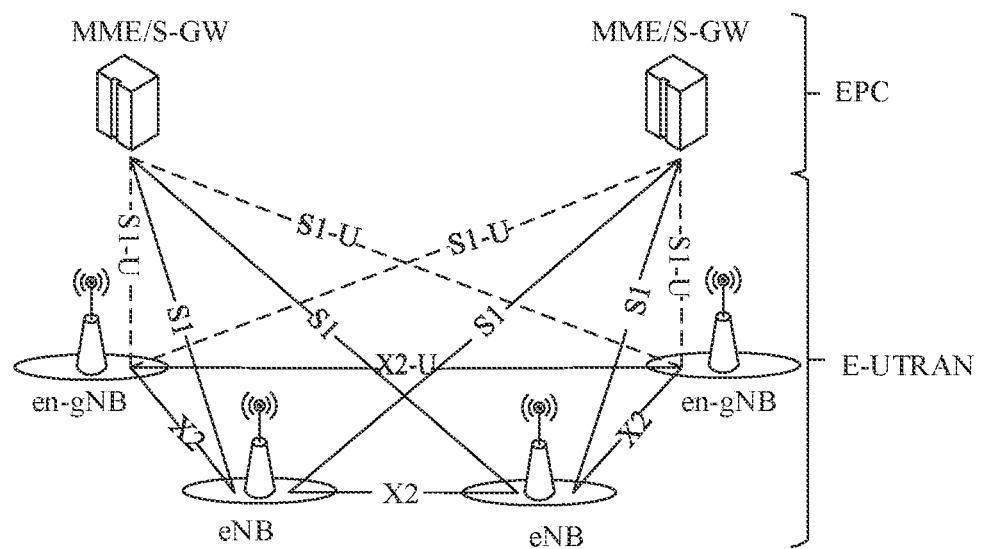
FIG. 1E is a schematic diagram of dual-connection architecture.
Figure 1F:
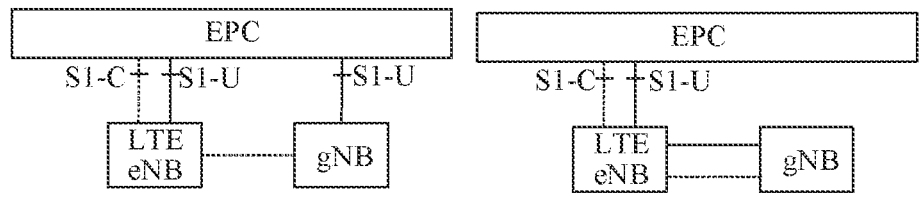
FIG. 1F is a schematic diagram of dual-connection architecture.
Figure 1G:
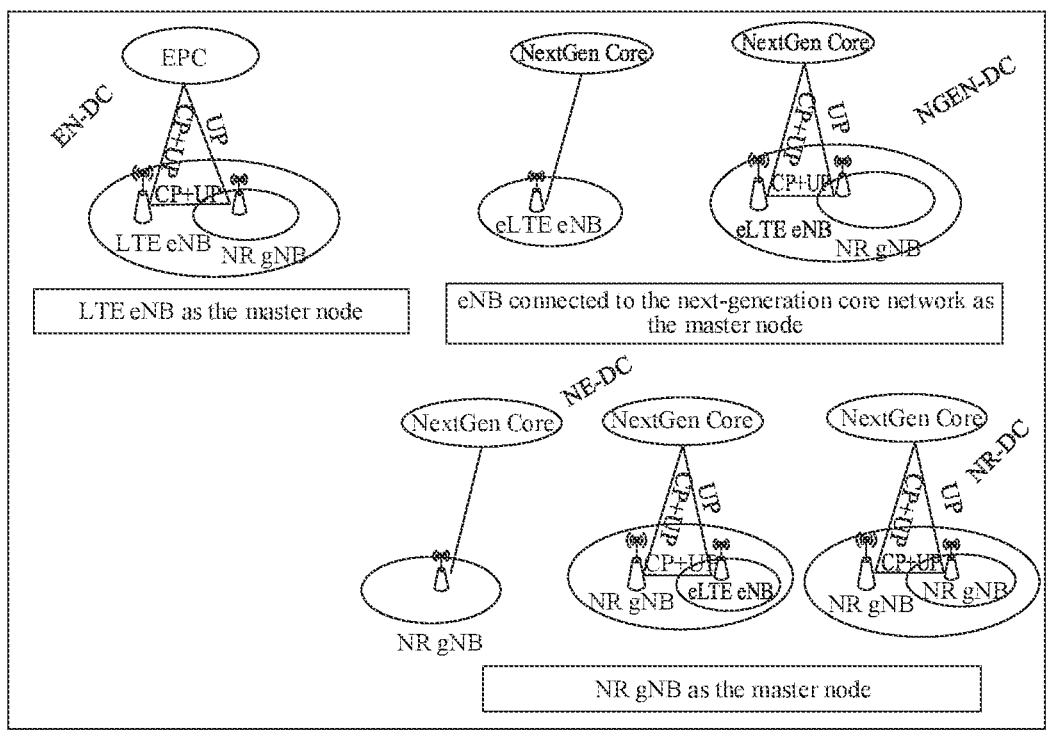
FIG. 1G is a schematic diagram of dual-connection architecture.
Figure 2:
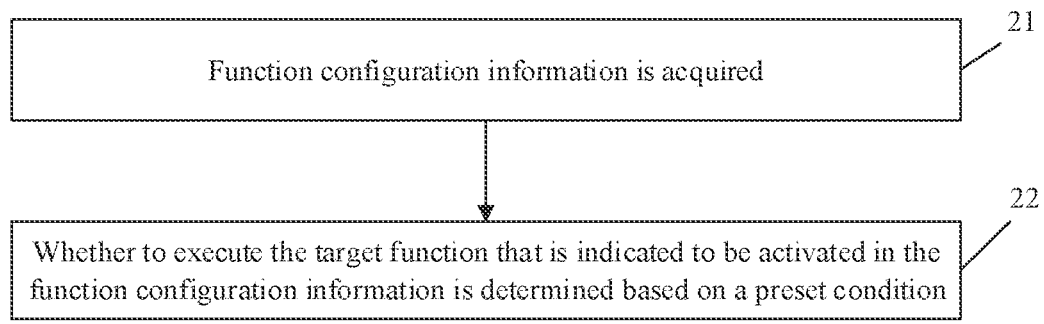
FIG. 2 is a first schematic flowchart of a method for controlling a function of a terminal device according to an embodiment of the present disclosure.
Figure 3:
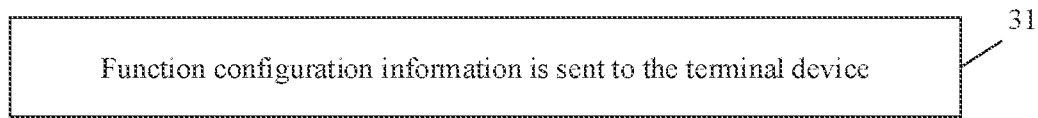
FIG. 3 is a second schematic flowchart of a method for controlling a function of a terminal device according to an embodiment of the present disclosure.

In order to meet the high-speed requirements, Carrier Aggregation (CA) technology is also supported in the 5G, as shown in FIG. 1-2 and FIG. 1-3. Joint scheduling and sources on multiple Component Carriers (CCs) are used in the CA, so that a large bandwidth can be supported in the NR system, so as to achieve a high peak rate of the system. According to the continuity of the aggregated carriers in the spectrum, the earner aggregation may be grouped into continuous earner aggregation and discontinuous earner aggregation. According to whether the bands of the aggregated earners are identical, the carrier aggregation is grouped into intra-band carrier aggregation and inter-band carrier aggregation.

The primary ceil component (PCC) is called as the primary carrier. The secondary cell component (SCC) is called as the secondary carrier. The SCC only provides additional wireless resources. Both the PCC and the SCC are called as service cells. The standard also stipulates that the maximum number of aggregated carriers is 5, that is, the maximum bandwidth after carrier aggregation is 100 MHZ, and the aggregated carriers belong to the same base station. All aggregated carriers use the same C-RNTI, and the base station can ensure that C-RNTIs do not collide in each cell of the carrier. Since asymmetric carrier aggregation and symmetric carrier aggregation are supported, the carriers required to be aggregated must be downlink carriers and may not be uplink carriers. In addition, for a primary carrier cell, a PDCCH and a PUCCH of the cell are contained, and only the primary carrier cell has the PUCCH, while other secondary carrier cell may have the PDCCH.

The SCell is configured via RRC dedicated signaling, and an initial configuration mode is a deactivated mode in which no data is sent or received. The SCell may be activated via an MAC CE to send and receive data. The architecture is not optimal in terms of delay of SCell configuration and activation. The delay in turn reduces the efficiency of CA usage and wireless resource, especially in a small cell deployment scenario. In a dense small cell deployment scenario, signaling load of each Scell is high, especially if each Scell needs to be configured separately. Therefore, the current CA architecture introduces an additional delay, limits the usage of CA, and reduces a gam of sharing of CA load.

In view of this, the LTE R15 optimizes the CA, and the main optimization functions include the following contents.

UE measurements during idle mode: the measurement configuration during the idle mode may be configured in the RRC release message, and the idle-mode measurement configuration may also be configured in a system broadcast SIB5. If there is a dedicated configuration, the dedicated configuration is used. Otherwise, the measurement configuration in SIB5 is used. Meanwhile, the idle-mode measurement configuration in SIB5 has no effective time limit, effect time configuration, that is, T331, is also configured in the idle-mode measurement configuration configured in the dedicated signaling. When T331 times out or stops, the idle-mode measurement configuration configured in the dedicated signaling is released, and whether UE continues to use the idle-mode measurement configuration in SIB5 depends on HE implementation.

After the idle-mode measurement configuration is obtained, the UE performs measurement, indicates, through the UL message, to the network side that there is an idle measurement result, and then reports the measurement result based on a manner requested by the base station. Also, the cell broadcasts whether a report for the idle measurement result is supported in an SIB2.

The above function of configuring measurement during the idle mode and executing the measurement by the UE and reporting the measurement result to the network side after UE enters the connection mode is called "idle-mode measurement report". Information of the idle-mode measurement configuration is shown in FIG. 1D. The carrierFreq and the allowedMeasBandwidth indicate a measurement frequency point and a measurement bandwidth. The validity Area configures a valid range of idle-mode measurement configuration, and is a cell list. If UE reselects a cell outside of the validityArea, the timer T331 is stopped. The measCellList provides a cell to which the measurement configuration is reported, and it is unnecessary to report to other cells. If the measCellList is not configured, the UE reports the measurement report to at most maxCellMeasIdle cells which meet the quality Threshold. The reported measurement quantity is specified by reportQuantities.

The idle-mode measurement configuration allows the network side to understand a channel environment of the UE quickly, and determine the addition of SCcell quickly, so that the UE uses the CA mode for data sending and receiving as soon as possible, thereby improving throughput and system capacity.

When the LTE serves as a Master Node (MN) and the Secondary Node is abbreviated as SN, network deployment and network architecture are shown in FIG. 1E and FIG. 1F. The MN node is mainly used for an RRC control function and a control plane towards the CN. The SN node may be configured with auxiliary signaling, such as SRB3, which mainly provides a data transmission function. In the later stage of R15, another DC mode such as NE-DC, 5GC-EN-DC, NR DC as shown in FIG. 1G is supported. For EN-DC, the core network connected with the access network is the EPC, while the core network connected to another DC mode is the 5GC.

Regardless of the CA configuration or the MR-DC configuration, it is necessary to reduce configuration and activation of the SCell and the configuration and activation delay of the SCG, so as to implement the improvement of cell capacity especially in the small cell deployment scenario.

It should be understood that the terms "system" and "network" herein are often used interchangeably. The term "and/or" in the disclosure is only an association relationship for describing associated objects and represents that three relationships may exist. For example, A and/or B may represent three conditions, i.e., independent existence of A, existence of both A and B and independent existence of B. In addition, the character "/" in the disclosure usually represents that previous and next associated objects form an "or" relationship.

In order to have a more detailed understanding of the characteristics and technical content of the embodiments of the present disclosure, the implementation of the embodiments of the present disclosure is described in detail in combination with the drawings. The drawings are only used for reference and are not used to define the embodiments of the present disclosure.

The embodiments of the present disclosure provide a method for controlling a function of a terminal device applied to the terminal device. As shown in FIG. 2, the method includes the following operations.

In S21, function configuration information is acquired. The function configuration information is used to instruct the terminal device to activate a target function.

In S22, whether to execute the target function that is indicated to be activated in the function configuration information is determined based on a preset condition.

Correspondingly, the embodiments of the present disclosure provide a method for controlling a function of a terminal device applied to a network device. As shown in FIG. 3, the method includes the following operations.

In S31, function configuration information is sent to the terminal device. The function configuration information is used to instruct the terminal device to activate a target function. Whether to execute the target function can be determined by the terminal device.

The target function is at least one of a radio resource management (RRM) relax function, a minimization of drive test (MDT) measurement reporting function, or an idle-mode measurement reporting function.

Specifically, for the purpose of energy saving, RRM in the NR is optimized to reduce the number of cells measured by the UE and/or the number of frequency layers. For example, the number of measured cells and/or the number of frequency layers are reduced according to beam information to achieve the purpose of energy saving.

The terminal device records information and reports to the network side, which assists the network to optimize the network functions. For example, MDT may be called as "network optimization configuration report".

The idle-mode measurement reporting refers to that the terminal device performs measurement according to the configuration in the idle or inactive mode, and report, the measurement result to the network side after the terminal device enters the connected mode.

It should be noted that the methods provided according to the embodiments may further include reporting capability indication information.

The capability indication information is used to indicate whether the terminal device supports at least one of an RRM relax function, an MDT measurement reporting function, or an idle-mode measurement reporting function.

The method on the network device side further includes the following operations.

Capability indication information from the terminal device is received.

The manner of reporting capability indication information may be adding some identification bits in an information field, and bit information of the identification bits indicates to the network device whether the terminal device supports the function corresponding to the identification bits. For example, a first bit is an identification bit for the RRM relax function, the function is supported if the bit is set to be 1, and the function is not supported if the bit is not set to be 1. Similar methods may also be used for other functions, which are not described exhaustively here. Capability indication information may also be reported in other manners, which are not described repeatedly herein.

The reporting for the capability indication information by the terminal device may be triggered in the following manner. The capability indication information may be reported by the terminal device, or the terminal device may report the capability indication information to the network device when the network device sends a capability reporting request to the terminal device.

In addition, in a case that the terminal device does not support a function, the terminal device does not execute the function.

The preset condition includes configuration of the network side and/or related information of the terminal device.

The related information of the terminal device includes at least one of:
 a state of the terminal device;
 target feature information which is of concern to the terminal device;
 a type of the terminal device;
 information of a slice accessed by the terminal device;
 a moving speed of the terminal device;
 a type of business executed by the terminal device; or
 a function type supported by the terminal device.

The preset condition is described in detail below.

In a first condition, the configuration of the network side may be configuration on the network side for the bearer, and the configuration may be performed by the network device for the type of business to be processed by the terminal device. For example, in a case that the terminal device is to execute a high-reliability business, a data radio bearer (DRB) of PDCP replication may be configured for the terminal device. Correspondingly, the operation that whether to execute the target function that is indicated to be activated in the function configuration in form a non is determined based on the configuration of the network side may include at least one of the following contents.

In a case that the DRB of PDCP replication data is configured for the terminal device by the network side, and the target function is RRM relax, it is determined not to activate the target function. Otherwise, it is determined to activate the target function. Since the terminal device configured with the DRB of PDCP duplication generally has businesses with high-reliability requirements, the primary goal is to ensure the performance of terminal device in this case, rather than energy saving. Therefore, RRM relax configuration may not be executed.

In a case that a primary carrier and a secondary carrier are configured for the terminal device by the network side, and the target function is idle-mode measurement reporting. Since it is determined according to the configuration information that the terminal device supports carrier aggregation, the target function may be executed.

In this case, the current business type may also be determined according to the configuration of the network side, and further whether to execute the target function is determined. For example, in a case that the current business is Ultra Reliable Low Latency Communication (uRLLC) business according to the configuration of the network side, it may be considered that the business performance should be guaranteed currently. Therefore, when the indicated target function is RRM relax, the function may not be executed. If the current business is massive machine-type communication (mMTC), the RRM relax function may be executed. Many cases may be contained, which are not described exhaustively in the embodiment.

In a second condition, whether to execute the target function is determined based on the state of the terminal device.

The state of the terminal device may be determined according to at least one of current remaining electric quantity, a current temperature, and current remaining memory of the terminal device.

In a case that the remaining electric quantity of the terminal device is lower than a preset electric quantity threshold, it may be determined that the current electric quantity is low and the terminal device is in an energy saving state. Correspondingly, in a case that the terminal device is in the energy saving state and the target function is RRM relax, it is determined that the target function may be activated.

In a case that the remaining electric quantity of the terminal device is not lower than the preset electric quantity threshold, whether to activate the RRM relax function may be determined by the terminal device, or whether to activate the target function may be determined by the terminal device according to another preset condition.

In a case that the temperature of the terminal device is higher than a preset temperature threshold, it may also be determined that there is no need to execute a business with great power consumption. Therefore, in a case that the target function is the idle-mode measurement reporting, the target function may not be executed. Alternatively, in a case that the target function is MDT measurement reporting, the function also may not be executed. In a case that the target function is RRM relax, the function may not be executed.

In a case that the remaining memory of the terminal device is lower than a preset memory threshold, the terminal device is in a memory-constrained state, and the terminal device is also unable to execute a function requiring high memory in this case, or the terminal device does not execute any function except the basic business. Therefore, in a case that the target function is the idle-mode measurement reporting, the function may not be executed. Alternatively, in a case that the target function is the MDT measurement reporting, the function may not be executed. In a case that the target function is RRM relax, the function may not be executed.

In a third condition, whether to execute the target function is determined according to the target feature information which is of concern to the terminal device.

The target feature information which is of concern to the terminal device may be performance of concern. For example, energy-saving performance is of concern to the terminal device, and in a case that the target function is RRM relax, the target function may be executed. The processing performance is of concern, energy-saving is not of concern, RRM relax may not be executed. In addition, in a case that the energy-saving is of concern to the terminal device, and the target function is the idle-mode measurement reporting or the MDT, the target function may not be executed.

For another example, in a case that the performance of processing efficiency rather than the performance of energy saving is of concern to the terminal device, the idle-mode measurement reporting function may not be executed. The processing efficiency may include processing efficiency of high-speed business or processing efficiency of high-reliability business.

In a fourth condition, whether to execute the target function is determined based on the type of the terminal device, which may include at least one of the following contents.

Whether to execute the target function that is indicated to be activated in the function configuration information is determined based on first indication information sent by the network side and the type of the terminal device. The first indication information is used to indicate a list of types of terminal devices, each type of which can activate a corresponding function.

Whether to execute the target function that is indicated to be activated in the function configuration information is determined based on second indication information sent by the network side. The second indication information is at least one function which can be activated by the terminal device and is determined by the network side based on the type of the terminal device.

Whether to execute the target function that is indicated to be activated in the function configuration information is determined based on the configuration of the network side and the type of the terminal device.

The type of terminal device may be determined based on at least one parameter. For example, the at least one parameter may include a moving speed of the terminal device, a QoS parameter of the terminal device, business volume of the terminal device, etc., which is not described exhaustively here. The classification based on the above parameters may be implemented as follows. When the moving speed is greater than a first-type speed threshold, the terminal device corresponds to a first-type terminal device. In this case, the first-type terminal device may also be understood as a high-speed moving terminal device. The business volume may be divided based on a preset threshold. For example, a terminal device having a business processing volume lower than a preset threshold may be classified as a terminal device with low service volume. Otherwise, the terminal device may be set as a terminal device with high business volume.

It should also be noted that a unified standard for type classification of terminal devices may be pre-stored in the terminal device and the network device side.

The first indication information may be first indication information sent by the network device via system broadcast or dedicated signaling.

The network device sends first indication information to the terminal device. The first indication information is used to indicate a list of types of terminal devices, each type of which can activate a corresponding function.

The network device may select at least a part of all terminal devices managed by the network device according to a current system condition of the network, to activate the target function. The network device may generate, according to the determined condition, a list of types of terminal devices which can active the target function. For example, high-speed moving terminal device does not activate the target function. Alternatively, an IoT terminal activates the idle-mode measurement reporting function, and so on.

It should also be understood that the first indication information may include at least one function, and each function corresponds to a type of terminal device winch can activate the function.

The terminal device determines whether there is the type of the terminal device corresponding to the target function according to the first indication information and the type of the terminal device determined by itself, in combination with the target function to be activated by the terminal device. If there is the type of terminal device, the target function is activated. Otherwise, the target function is not activated.

The second indication information may be sent to the terminal device through dedicated signaling. It should be understood that the second indication information may indicate at least one function that can be activated by the terminal device, and may also indicate at least one function that cannot be activated by the terminal device.

The network device may send second indication information to the terminal device based on the type of the terminal device. The second indication information is at least one function winch can be activated by the terminal device.

The network device determines, according to the type of the terminal device, at least one function which can be activated by the terminal device. For example, the network side acquires a moving state or a moving speed of the UE, and the network side determines not to configure MDT measurement configuration for relatively static terminal types. For another example, the network side acquires a Qos parameter, and determines not to configure RRM relax for terminal types with ultra-reliable low-latency based on the Qos parameter. For another example, the network side acquires the type or business volume indication information of the terminal, and the network side does not configure the idle-mode measurement reporting function for the terminal device of IoT type or the terminal with low business volume.

The network device acquires the type of the terminal device through the terminal device. For example, the network device acquires the type of the terminal device by information reported by the terminal device, or by sending request information to the terminal device. The network device may also acquire the type of terminal device through a core network. For example, the core network is searched for the type of terminal device through identity information of the terminal device.

In a fifth condition, whether to execute the target function is determined based on a slice accessed by UE, which includes the following contents.

Whether to execute the target function that is indicated to be activated in the function configuration information is determined based on third indication information sent by the network side and an identity of a slice which is currently used by the terminal device. The third indication information is used to indicate a list of identities of slices which can activate the target function, or indicate a list of identities of slices which cannot activate the target function.

Whether to execute the target function that is indicated to be activated in the function configuration information is determined based on third indication information sent by the network side and an identity of a slice allowed to be used by the terminal device.

Whether to execute the target function that is indicated to be activated in the function configuration information is determined based on third indication information sent by the network side and an identity of a slice configured by the network side for the terminal device.

Correspondingly, the network device may send third indication information to the terminal device. The third indication information is used to indicate a list of identities of slices which can activate the target function, or indicate a list of identities of slices which cannot activate the target function.

For example, the network side configures the third indication information through dedicated signaling or system broadcast, and acquires, through the third indication information, a list of identities ids of slices which are allowed to activate or are not allowed to activate the function by the network device. The third indication information may include at least one function, and a list of identities of slices, corresponding to each function, winch are allowed to activate or are not allowed to activate the function. Alternatively, the third indication information may further include a list of identities of slices, corresponding to the target function, which are allowed to activate or are not allowed to activate the function.

Furthermore, the terminal device may determine whether to activate a certain function according to the slice (i.e., an identity of a slice corresponding to a PDU session established and activated by the UE) used by the terminal device, or identities (Allowed S-NSSAIs) of slices allowed by the terminal device, or the identities (Configured S-NSSAIs) of slices configured by the network side for the terminal device.

In a sixth condition, whether to execute a function or change relevant parameters of some function configuration is determined according to the moving speed.

Specifically, whether to execute the target function that is indicated to be activated in the function configuration information is determined based on fourth indication information sent by the network side and the moving speed of the terminal device. The fourth indication information is used to indicate speed configuration information with which the target function can be executed.

That is, the network device sends the fourth indication information to the terminal device. The fourth indication information is used to indicate speed configuration information with winch the target function can be executed.

The speed configuration information may include a threshold of the moving speed or a moving state list. That is to say, the fourth indication information may include a target function and speed configuration information corresponding to the target function. Alternatively, the fourth indication information may be at least one function or speed configuration information corresponding to each function.

The terminal device may determine whether to activate the target function according to the fourth indication information, the moving speed of the terminal device and the target function to be activated.

For example, the network side sends fourth indication information, and a speed threshold or a moving state list corresponding to a function is indicated to the terminal device through the fourth indication information. The terminal device determines whether to execute the function according to a speed thereof. For example, in a case that the terminal device is at a low speed, or in one or more of the moving states, the terminal device does not execute MDT measurement and the terminal device executes RRM relax. In a case that the terminal device is at a high speed, the MDT measurement or RRM relax is not executed.

For example, when the terminal device is at a low speed, the MDT or the idle-mode measurement reporting may be allowed to be executed. Furthermore, the fourth indication information may further include a measurement interval that may be increased when the speed of the terminal device is lower than the speed threshold.

In a seventh condition, whether to activate the function is determined based on the type of business which is being executed.

Whether to execute the target function indicated to be activated in the function configuration information is determined based on fifth indication information sent by the network side and a 5G Quality of Service identifier (5QI) corresponding to a bearer of the terminal device. The fifth indication information is used to indicate a list of 5QIs that are allowed or not allowed to execute the target function.

The network device sends fifth indication information to the terminal device. The fifth indication information is used to indicate a list of 5QIs that are allowed or not allowed to execute the target function. For example, the network side configures the fifth indication information through dedicated signaling or system broadcast, and the fifth indication information indicates the list of 5QI which are allowed or not allowed to activate the function by the terminal device, and the UE determines whether to activate the function according to the 5QI corresponding to the bearer configured by the network side.

A list of correspondences between 5QIs and QoS parameters is described below, that is, a corresponding service type may be determined through the correspondences between 5QIs and QoS parameters. An example is described as follows:

It should be understood that the correspondences of 5QIs and QoS parameters illustrated in the above list are only a part of examples, and in fact there may be more correspondences, which are not described exhaustively m the embodiment.

In an eighth condition, whether to execute the function is determined according to whether other functions are supported.

That is, whether to activate the target function is determined according to the function type supported by the terminal device.

For example, the function type may be whether carrier aggregation is supported, or the function type may be whether a dual link function is supported, whether to execute the target function may also be determined according to a combination of bandwidths. For example, it may be preset that the target function can be activated in a case that a function type of a combination of some bandwidths is supported.

For example, if the terminal device does not support carrier aggregation or dual link function, the terminal device does not receive configuration information related to idle-mode measurement reporting, or does not activate the idle-mode measurement reporting function, or does not support a combination of some bands. The terminal device does not activate the idle-mode measurement reporting function.

In combination, a method for controlling a function of a terminal device provided in the embodiment, in conjunction with FIG. 2 and FIG. 3, includes the following operations.

In S31, function configuration information is sent to the terminal device. The function configuration information is used to instruct the terminal device to activate a target function, and the terminal device can determine whether to execute the target function.

In S21, function configuration information is acquired. The function configuration information is used to instruct the terminal device to activate a target function.

In S22, whether to execute the target function that is indicated to be activated in the function configuration information is determined based on a preset condition.

In the embodiment, only one condition or a combination of multiple conditions of the above multiple conditions for determining whether to activate the target function may be used. Which condition is used may be indicated to the terminal device by the network device, or may be determined by the terminal device. A scenario in which a part of conditions are combined is illustrated by combining several examples as follows.

First Scenario

Determining whether to activate the target function by combining a state of the terminal device and a moving speed of the terminal device may be include following operations.

| A value of 5QI | resource type | Default preferred value | Packet delay budget | Packet error rate | Default maximum data pulse | Default average window | Business |
|---|---|---|---|---|---|---|---|
| 1 | GBR | 20 | 100 ms | $10^{-2}$ | N/A | 2000 ms | Voice |
| 2 | | 40 | 150 ms | $10^{-3}$ | N/A | 2000 ms | Voice (real-time voice stream) |
| 3 | | 30 | 50 ms | $10^{-3}$ | N/A | 2000 ms | Real-time voice; V2X information; Power Distribution-Medium; Processing auto-detection |
| 4 | | 50 | 300 ms | $10^{-6}$ | N/A | 2000 ms | Non-talk video (cached stream) |
| 65 | | 7 | 75 ms | $10^{-2}$ | N/A | 2000 ms | Mission-critical user plane analogue interphone functions (such as MCPTT) |

The function configuration information sent by the terminal device to the network device is received. The function configuration information indicates to activate the RRM relax measurement reporting function.

If the terminal device is not in an energy-saving state, it may be determined not to execute the RRM relax configuration. If the terminal device is in the energy-saving state, the RRM relax configuration may be executed.

In addition, if the terminal device is not in the energy-saving state, the determination is performed further by combining the moving speed of the terminal device. In this case, whether the RRM relax function may be activated may be determined according to the fourth indication information sent by the network device.

Second Scenario

Whether to activate the target function is determined by combining the target feature information of concern to the terminal device and a slice identifier of the terminal device.

For example, the target feature information of concern to the terminal device is business performance, the RRM relax function may be executed in a case that the terminal device is concerned with energy saving. In a case that the slice having the slice identifier is not allowed to execute the target function RRM relax indicated in the third indication information, even if the terminal device is allowed to execute the RRM Relax by the business performance, it is further determined not to execute the function based on the slice identifier.

It should be understood that there may be a combination of many conditions and it is not limited to the above two scenarios, and many conditions may be combined under the many scenarios. For example, configuration of the network device, a function type of terminal device, and a moving speed of the terminal device and the like are combined to determine whether to allow the target function to be activated. Alternatively, all of the above conditions may be combined for determination, which is not described repeatedly anymore in the embodiment.

Finally, it should be noted that the possible target functions mentioned in the embodiment are only some examples. In fact, there may be more functions, which are not described exhaustively in the embodiment.

It may be seen that, with the above solution, when the network device indicates to the terminal device the target function to be activated, the terminal device may further determine whether to allow the target function to be activated by itself in combination with the preset condition, thereby maximizing overall efficiency of the terminal device, and reducing the impact of the target function to be activated on processing efficiency of the terminal device.

Figure 4:
FIG. 4 is a schematic diagram of a composition structure of a terminal device according to an embodiment of the present disclosure.

The embodiments further provide a terminal device, as shown in FIG. 4, which includes a first communication unit 41 and a first processing unit 42.

The first communication unit 41 is configured to acquire function configuration information. The function configuration information is used to instruct the terminal device to activate a target function.

The first processing unit 42 is configured to determine, based on a preset condition, whether to execute the target function that is indicated to be activated in the function configuration information.

The target function is at least one of an RRM relax function, an MDT measurement reporting function, or an idle-mode measurement reporting function.

It should be noted that the first communication unit 41 provided in the embodiment is configured to report capability indication information.

The capability indication information is used to indicate whether the terminal device supports at least one of the RRM relax function, the MDT measurement reporting function, or an idle-mode measurement reporting function.

The manner of reporting capability indication information may be adding some identification bits in an information field, and bit information of the identification bits indicates to the network device whether the terminal device supports the function corresponding to the identification bits. For example, a first bit is an identification bit for the RRM relax function, the function is supported if the bit is set to be 1, and the function is not supported if the bit is not set to be 1. Similar methods may also be used for other functions, which are not described exhaustively here. Capability indication information may also be reported in other manners, which are not described repeatedly herein.

The reporting for the capability indication information by the terminal device may be triggered in the following manner. The capability indication information may be reported by the terminal device, or the terminal device may report the capability indication information to the network device when the network device sends a capability reporting request to the terminal device.

In addition, in a case that the terminal device does not support a function, the terminal device does not execute the function.

The preset condition includes configuration of a network side and/or related information of the terminal device.

The related information of the terminal device includes at least one of:
a state of the terminal device;
target feature information which is of concern to the terminal device;
a type of the terminal device;
information of a slice accessed by the terminal device;
a moving speed of the terminal device:
a type of business executed by the terminal device; or
a function type supported by the terminal device.

The preset condition is described in detail below:

In a first condition, the configuration of the network side may be configuration of the network side for a bearer, and the configuration may be performed by the network device for the type of business to be processed by the terminal device. For example, in a case that the terminal device is to execute a high-reliability business, a DRB of PDCP replication may be configured for the terminal device. Correspondingly, the operation that whether to execute the target function that is indicated to be activated in the function configuration information is determined based on the configuration of the network side may include at least one of the following contents.

In a case that the DRB of PDCP replication data is configured for the terminal device by the network side, and the target function is RRM relax, it is determined not to activate the target function. Otherwise, it is determined to activate the target function. Since the terminal device configured with the DRB of PDCP duplication generally has businesses with high-reliability requirements, the primary goal is to ensure the performance of terminal device in this case, rather than energy saving. Therefore, RRM relax configuration may not be executed.

In a case that a primary carrier and a secondary earner are configured for the terminal device by the network side, and the target function is idle-mode measurement reporting. Since it is determined according to the configuration information that the terminal device supports carrier aggregation, the target function may be executed.

In this case, the current business type may also be determined according to the configuration of the network side, and further whether to execute the target function is determined. For example, in a case that the current business is the uRLLC business according to the configuration of the network side, it may be considered that the business performance should be guaranteed currently. Therefore, when the indicated target function is RRM relax, the function may not be executed. If the current business is massive machine-type communication (mMTC), the RRM relax function may be executed. Many cases may be contained, which are not described exhaustively in the embodiment.

In a second condition, the first processing unit 42 is configured to determine whether to execute the target function based on the state of the terminal device.

The state of the terminal device may be determined according to at least one of current remaining electric quantity, a current temperature, and current remaining memory of the terminal de vice.

In a case that the remaining electric quantity of the terminal device is lower than a preset electric quantity threshold, it may be determined that the current electric quantity is low and the terminal device is in an energy saving state. Correspondingly, in a case that the terminal device is in the energy saving state and the target function is RRM relax, it is determined that the target function may be activated.

In a case that the remaining electric quantity of the terminal device is not lower than the preset electric quantity threshold, whether to activate the RRM relax function may be determined by the terminal device, or whether to activate the target function may be determined by the terminal device according to another preset condition.

In a case that the temperature of the terminal device is higher than a preset temperature threshold, it may also be determined that there is no need to execute a business with great power consumption. Therefore, in a case that the target function is the idle-mode measurement reporting, the target function may not be executed. Alternatively, in a case that the target function is MDT measurement reporting, the function also may not be executed. In a case that the target function is RRM relax, the function may not be executed.

In a case that the remaining memory of the terminal device is lower than a preset memory threshold, the terminal device is in a memory-constrained state, and the terminal device is also unable to execute a function requiring high memory in this case, or the terminal device does not execute any function except the basic business. Therefore, in a case that the target function is the idle-mode measurement reporting, the function may not be executed. Alternatively, in a case that the target function is the MDT measurement reporting, the function may not be executed. In a case that the target function is RRM relax, the function may not be executed.

In a third condition, the first processing unit 42 is configured to determine whether to execute the target function according to the target feature information which is of concern to the terminal device.

The target feature information which is of concern to the terminal device may be performance of concern. For example, energy-saving performance is of concern to the terminal device, and in a case that the target function is RRM relax, the target function may be executed. The processing performance is of concern, energy-saving is not of concern, RRM relax may not be executed. In addition, in a case that the energy-saving is of concern to the terminal device, and the target function is the idle-mode measurement reporting or the MDT, the target function may not be executed.

For another example, in a case that the performance of processing efficiency rather than the performance of energy saving is of concern to the terminal device, the idle-mode measurement reporting function may not be executed. The processing efficiency may include processing efficiency of high-speed business or processing efficiency of high-reliability business.

In a fourth condition, the first processing unit 42 is configured to determine whether to execute the target function based on the type of the terminal device, which may include at least one of the following contents.

Whether to execute the target function that is indicated to be activated in the function configuration information is determined based on first indication information sent by the network side and the type of the terminal device. The first indication information is used to indicate a list of types of terminal devices, each type of which can activate a corresponding function.

Whether to execute the target function that is indicated to be activated in the function configuration information is determined based on second indication information sent by the network side. The second indication information is at least one function which can be activated by the terminal device and is determined by the network side based on the type of the terminal device.

Whether to execute the target function that is indicated to be activated in the function configuration information is determined based on the configuration of the network side and the type of the terminal device.

The type of terminal device may be determined based on at least one parameter. For example, the at least one parameter may include a moving speed of the terminal device, a QoS parameter of the terminal device, business volume of the terminal device, etc., which is not described exhaustively here. The classification based on the above parameters may be implemented as follows. When the moving speed is greater than a first-type speed threshold, the terminal device corresponds to a first-type terminal device. In this case, the first-type terminal device may also be understood as a high-speed moving terminal device. The business volume may be divided based on a preset threshold. For example, a terminal device having a business processing volume lower than a preset threshold may be classified as a terminal device with low service volume. Otherwise, the terminal device may be set as a terminal device with high business volume.

It should also be noted that a unified standard for type classification of terminal devices may be pre-stored in the terminal device and the network device side.

The first indication information may be first indication information sent by the network device via system broadcast or dedicated signaling.

The network device sends first indication information to the terminal device. The first indication information is used to indicate a list of types of terminal devices, each of which can activate a corresponding function.

The network device may select at least a part of all terminal devices managed by the network device according to a current system condition of the network, to activate the target function. The network device may generate, according to the determined condition, a list of types of terminal devices which can active the target function. For example, high-speed moving terminal device does not activate the target function. Alternatively, an IoT terminal activates the idle-mode measurement reporting function, and so on.

It should also be understood that the first indication information may include at least one function, and each function corresponds to a type of terminal device which can activate the function.

The terminal device determines whether there is the type of the terminal device corresponding to the target function according to the first indication information and the type of the terminal device determined by itself, in combination with the target function to be activated by the terminal device. If there is the type of terminal device, the target function is activated. Otherwise, the target function is not activated.

The second indication information may be sent to the terminal device through dedicated signaling. It should be understood that the second indication information may indicate at least one function that can be activated by the terminal device, and may also indicate at least one function that cannot be activated by the terminal device.

The network device may send second indication information to the terminal device based on the type of the terminal device. The second indication information is at least one function which can be activated by the terminal device.

The network device determines, according to the type of the terminal device, at least one function which can be activated by the terminal device. For example, the network side acquires a moving state or a moving speed of the UE, and the network side determines not to configure MDT measurement configuration for relatively static terminal types. For another example, the network side acquires a Qos parameter, and determines not to configure RRM relax for terminal types with ultra-reliable low-latency based on the Qos parameter. For another example, the network side acquires the type or business volume indication information of the terminal, and the network side does not configure the idle-mode measurement reporting function for the terminal device of IoT type or the terminal with low business volume.

The network device acquires the type of the terminal device through the terminal device. For example, the network device acquires the type of the terminal device by information reported by the terminal device, or by sending request information to the terminal device. The network device may also acquire the type of terminal device through a core network. For example, the core network is searched for the type of terminal device through identity information of the terminal device.

In a fifth condition, whether to execute the target function is determined based on a slice accessed by UE.

The first processing unit 42 includes at least one of the following contents Whether to execute the target function that is indicated to be activated in the function configuration information is determined based on third indication information sent by the network side and an identity of a slice which is currently used by the terminal device. The third indication information is used to indicate a list of identities of slices which can activate the target function, or indicate a list of identities of slices winch cannot activate the target function.

Whether to execute the target function that is indicated to be activated in the function configuration information is determined based on third indication information sent by the network side and an identity of a slice allowed to be used by the terminal device.

Whether to execute the target function that is indicated to be activated in the function configuration information is determined based on third indication information sent by the network side and an identity of a slice configured by the network side for the terminal device.

Correspondingly, the network device may send third indication information to the terminal device. The third indication information is used to indicate a list of identities of slices which can activate the target function, or indicate a list of identities of slices which cannot activate the target function.

For example, the network side configures the third indication information through dedicated signaling or system broadcast, and acquires, through the third indication information, a list of identities ids of slices which are allowed to activate or are not allowed to activate the function by the network device. The third indication information may include at least one function, and a list of identities of slices, corresponding to each function, which are allowed to activate or are not allowed to activate the function. Alternatively, the third indication information may further include a list of identities of slices, corresponding to the target function, which are allowed to activate or are not allowed to activate the function.

Furthermore, the terminal device may determine whether to activate a certain function according to the slice (i.e., an identity of a slice corresponding to a PDU session established and activated by the UE) used by the terminal device, or identities (Allowed S-NSSAIs) of slices allowed by the terminal device, or the identities (Configured S-NSSAIs) of slices configured by the network side for the terminal device.

In a sixth condition, whether to execute a function or change relevant parameters of some function configuration is determined according to the moving speed.

Specifically, the first processing unit 42 is configured to determine whether to execute the target function that is indicated to be activated in the function configuration information based on fourth indication information sent by the network side and the moving speed of the terminal device. The fourth indication information is used to indicate speed configuration information with which the target function can be executed.

That is, the network device sends the fourth indication information to the terminal device. The fourth indication information is used to indicate speed configuration information with which the target function can be executed.

The speed configuration information may include a threshold of the moving speed or a moving state list. That is to say, the fourth indication information may include a target function and speed configuration information corresponding to the target function. Alternatively, the fourth indication information may be at least one function or speed configuration information corresponding to each function.

The terminal device may determine whether to activate the target function according to the fourth indication information, the moving speed of the terminal device and the target function to be activated.

For example, the network side sends fourth indication information, and a speed threshold or a moving state list corresponding to a function is indicated to the terminal device through the fourth indication information. The terminal device determines whether to execute the function according to a speed thereof. For example, in a case that the terminal device is at a low speed, or in one or more of the moving states, the terminal device does not execute MDT measurement and the terminal device executes RRM relax. In a case that the terminal device is at a high speed, the MDT measurement or RRM relax is not executed.

For example, when the terminal device is at a low speed, the MDT or the idle-mode measurement reporting may be allowed to be executed. Furthermore, the fourth indication information may further include a measurement interval that may be increased when the speed of the terminal device is lower than the speed threshold.

In a seventh condition, whether to activate the function is determined based on the type of business which is being executed.

The first processing unit 42 is configured to determine whether to execute the target function indicated to be activated in the function configuration information based on fifth indication information sent by the network side and a 5G Quality of Service Identifier (5QI) corresponding to a bearer of the terminal device. The fifth indication information is used to indicate a list of 5QIs that are allowed or not allowed to execute the target function.

The network device sends fifth indication information to the terminal device. The fifth indication information is used to indicate a list of 5QIs that are allowed or not allowed to execute the target function. For example, the network side configures the fifth indication information through dedicated signaling or system broadcast, and the fifth indication information indicates the list of 5QIs which are allowed or not allowed to activate the function by the terminal device, and the UE determines whether to activate the function according to the 5QI corresponding to the bearer configured by the network side.

It should be understood that the correspondences of 5QIs and QoS parameters illustrated in the above list are only a part of examples, and in fact there may be more correspondences, which are not described exhaustively in the embodiment.

In an eighth condition, whether to execute the function is determined according to whether other functions are supported.

The first processing unit 42 is configured to determine whether to activate the target function according to the function type supported by the terminal device.

For example, the function type may be whether carrier aggregation is supported, or the function type may be whether a dual link function is supported. Whether to execute the target function may also be determined according to a bandwidth combination. For example, it may be preset that the target function can be activated in a case that a function type of a combination of some bandwidths is supported.

For example, if the terminal device does not support earner aggregation or dual link function, the terminal device does not receive configuration information related to idle-mode measurement reporting, or does not activate the idle-mode measurement reporting function, or does not support a combination of some bands. The terminal device does not activate the idle-mode measurement reporting function.

In the embodiment, only one condition or a combination of multiple conditions of the above multiple conditions for determining whether to activate the target function may be used. Which condition is used may be indicated to the terminal device by the network device, or may be determined by the terminal device. A scenario in which a part of conditions are combined is illustrated by combining several examples as follows.

Finally, it should be noted that the possible target functions mentioned in the embodiment are only some examples. In fact, there may be many functions, which are not described exhaustively in the embodiment.

It may be seen that with the above solution, when the network device indicates a target function to be activated to the terminal device, the terminal device may further determine whether the target function is allowed to be activated in combination with the preset condition. In this way, overall efficiency of the terminal device can be maximized, and impact of the target function to be activated on the processing efficiency of the terminal device can be reduced.

Figure 5:
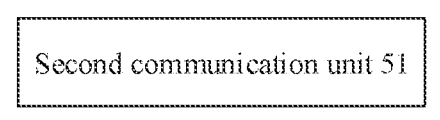

The embodiments further provide a network device, as shown in FIG. 5, which includes a second communication unit 51.

The second communication unit 51 is configured to send function configuration information to a terminal device. The function configuration information is used to instruct the terminal device to activate a target function, and whether to execute the target function may be determined by the terminal device.

The target function is at least one of an RRM relax function, an MDT measurement reporting function, or an idle-mode measurement reporting function.

The second communication unit 51 is configured to receive capability indication information from the terminal device.

The capability indication information is used to indicate whether the terminal device supports at least one of the RRM relax function, the MDT measurement reporting function, or an idle-mode measurement reporting function.

The second communication unit 51 is configured to perform at least one of the following operations.

First indication information is sent to the terminal device. The first indication information is used to indicate a list of types of terminal devices, each type of which can activate a corresponding function.

Second indication information is sent to the terminal device based on a type of the terminal device. The second indication information is at least one function which can be activated by the terminal device.

The second communication unit 51 is configured to send third indication information to the terminal device. The third indication information is used to indicate a list of identities of slices which can activate the target function, or indicate a list of identities of slices which cannot activate the target function.

The second communication unit 51 is configured to send fourth indication information to the terminal device. The fourth indication information is used to indicate speed configuration information with which the target function can be executed.

The second communication unit 51 is configured to send fifth indication information to the terminal device. The fifth indication information is used to indicate a list of 5QIs that are allowed or not allowed to execute the target function.

It should be noted that the functions executed by the base station provided in the embodiment are the same as those provided in the preceding method, which are not described repeatedly here anymore.

It may be seen that with the above solution, when the network device indicates a target function to be activated to the terminal device, the terminal device may further determine whether the target function is allowed to be activated in combination with the preset condition. In this way, overall efficiency of the terminal device can be maximized, and impact of the target function to be activated on the processing efficiency of the terminal device can be reduced.

Figure 6:
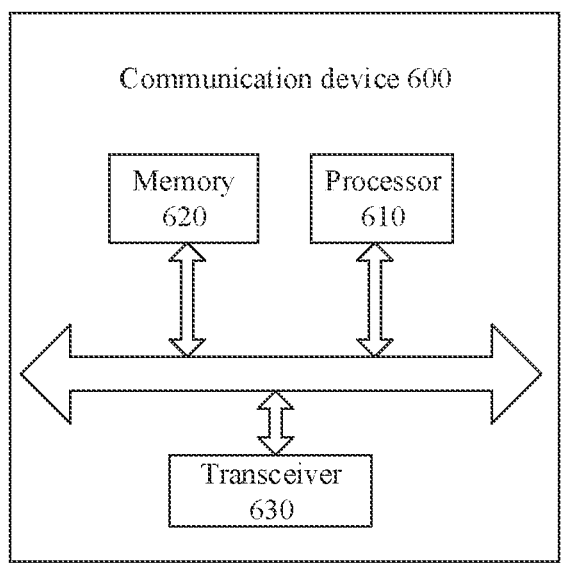
FIG. 6 is a schematic diagram of a composition structure of a communication device according to an embodiment of the present disclosure.

FIG. 6 is a schematic structural diagram of a communication device 600 provided in an embodiment of the disclosure. The communication device may be the terminal device or the network device mentioned in the embodiment. The communication device 600 shown in FIG. 6 includes a processor 610, which may call and run a computer program from a memory to implement the method in the embodiment of the disclosure.

Optionally, as shown in FIG. 6, the communication device 600 may further include a memory 620. The processor 610 may call and run a computer program from the memory to implement the method in the embodiment of the disclosure.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices. Specifically, the processor may control the transceiver to send information or data to other devices, or receive information or data sent by other devices.

The transceiver 630 may include a transmitter and a receiver. The transceiver 630 may further include an antenna, the number of which may be one or more.

Optionally, the communication device 600 may specifically be a network device of an embodiment of the disclosure, and the communication device 600 may implement the corresponding process implemented by the network device in each method of the embodiment of the disclosure, winch are not described repeatedly herein for simplicity.

Optionally, the communication device 600 may specifically be a terminal device or a mobile device of an embodiment of the disclosure, and the communication device 600 may implement the corresponding process implemented by the mobile terminal or the terminal device in each method of the embodiment of the disclosure, which are not described repeatedly herein for simplicity.

Figure 7:
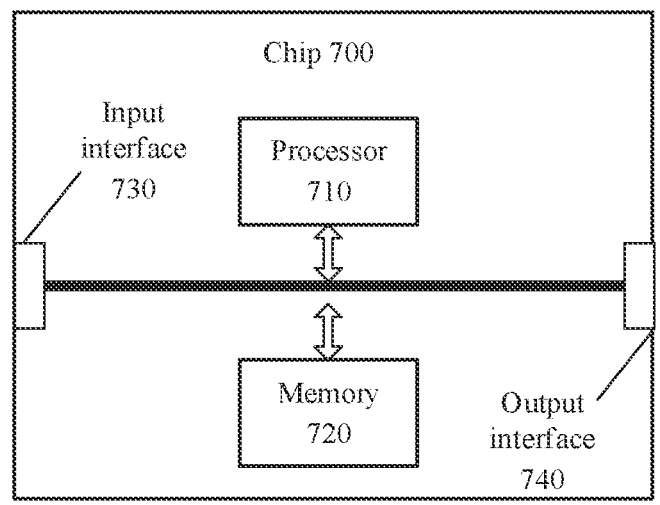
FIG. 7 is a schematic block diagram of a chip according to an embodiment of the present disclosure.

FIG. 7 is a schematic diagram of a chip in an embodiment of the disclosure. The chip 700 shown in FIG. 7 includes a processor 710, which may call and run a computer program from a memory to implement the method in the embodiment of the disclosure.

Optionally, as shown in FIG. 7, the chip 700 may also include a memory 720. The processor 710 may call and run a computer program from the memory 720 to implement the method in the embodiment of the disclosure.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the processor may control the input interface to obtain information or data sent by other devices or chips.

Optionally, the chip 700 may further include an output interface 740. The processor 710 may control the output interface 740 to communicate with other devices or chips. Specifically, the processor may control the output interface to output information or data sent by other devices or chips.

Optionally, the chip may be applied to the network device in the embodiment of the disclosure, and the chip may implement the corresponding process implemented by the network device in each method of the embodiment of the disclosure, which are not described repeatedly herein for simplicity.

Optionally, the chip may be applied to the terminal device in the embodiment of the disclosure, and the chip may implement the process implemented by the terminal device in each method of the embodiment of the disclosure, which are not described repeatedly herein for simplicity.

It should be understood that the chip mentioned in the embodiments of the disclosure may also be referred to as a system-level chip, a system chip, a chip system or a system on chip, etc.

Figure 8:
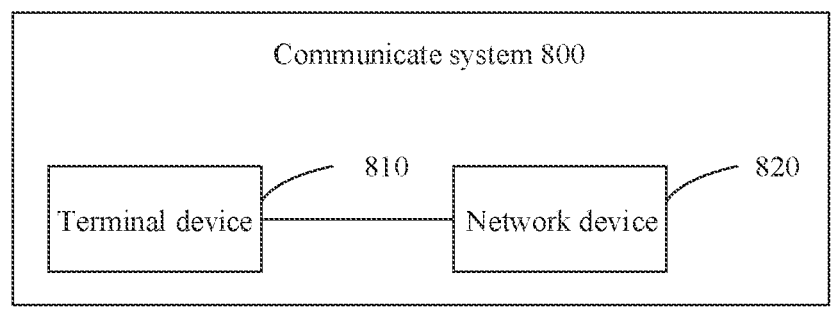
FIG. 8 is a second schematic diagram of architecture of a communication system according to an embodiment of the present disclosure.

FIG. 8 is a schematic block diagram of a communication system 800 provided in an embodiment of the disclosure.

As shown in FIG. 8, the communication system 800 includes a terminal device 810 and a network device 820.

The terminal device 810 may be configured to realize the corresponding functions realized by the terminal device in the above method, and the network device 820 may be configured to realize the corresponding functions realized by the network device in the above method, which are not described repeatedly here anymore.

It is to be understood that the processor in the embodiment of the disclosure may be an integrated circuit chip and has a signal processing capacity. In an implementation process, each step of the above method embodiments may be implemented by an integrated logical circuit of hardware in the processor or an instruction in a software form. The above processor may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like.

It can be understood that the memory in the embodiment of the disclosure may be a volatile memory or a nonvolatile memory, or may include both the volatile and nonvolatile memories. The nonvolatile memory may be a read-only memory (ROM), a programmable ROM (PROM), an Erasable PROM (EPROM), an Electrically EPROM (EEPROM) or a flash memory. The volatile memory may be a random access memory (RAM), and is used as an external high-speed cache, it is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but is not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM.

The embodiments of the disclosure further provide a computer-readable storage medium for storing computer programs.

Optionally, the computer-readable storage medium may be applied to the network device or the terminal device in the embodiments of the disclosure, and the computer program enables a computer to execute corresponding flows implemented by the network device in each method of the embodiments of the disclosure, which is not described repeatedly here anymore for simplicity.

The embodiments of the disclosure further provide a computer program product, including computer program instructions.

Optionally, the computer program product may be applied to a network device or the terminal device in the embodiments of the disclosure, and the computer program instructions enable a computer to execute corresponding flows implemented by the network device in each method of the embodiments of the disclosure, which is not described repeatedly here anymore for simplicity.

The embodiments of the disclosure further provide a computer program.

Optionally, the computer program may be applied to a network device or the terminal device in the embodiments of the disclosure, and the computer program runs in a computer to enable the computer to execute corresponding flow's implemented by the network device in each method of the embodiments of the disclosure, which is not described repeatedly here anymore for simplicity.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall not be considered to extend beyond the scope of the disclosure.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed.

The units described as separate parts may be or may not be physically separated, and parts displayed as units may be or may not be PHY units, that is, the parts may be arranged in the same place, or may also be distributed to multiple network units. Part or all of the units may be selected to achieve the purpose of the solutions of the embodiments according to a practical requirement.

In addition, functional units in each embodiment of the disclosure may be integrated into a processing unit, each unit may also physically exist independently, and two or more than two units may also be integrated into a unit.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A method for controlling a function of a terminal device, applied to the terminal device and comprising:
   acquiring function configuration information, wherein the function configuration information is used to instruct the terminal device to activate a target function, wherein the target function is a radio resource management (RRM) relax function; and
   determining, based on a preset condition, whether to execute the target function that is indicated to be activated in the function configuration information, wherein the preset condition comprises whether carrier aggregation is supported by the terminal device,
   wherein a type of the terminal device is determined based on a business volume of the terminal device.

2. The method of claim 1, wherein the function configuration information includes information regarding a data radio bearer (DRB) of a packet data convergence protocol (PDCP) replication.

3. The method of claim 1, wherein the function configuration information includes a type of the terminal device is determined based on a moving speed of the terminal device.

4. A terminal device, comprising a processor and a memory used to store a computer program capable of running on the processor, wherein
   the memory is configured to store the computer program; and
   the processor is configured to call and execute the computer program stored in the memory to:
   acquire function configuration information, wherein the function configuration information is used to instruct the terminal device to activate a target function, wherein the target function is a radio resource management (RRM) relax function; and
   determine, based on a preset condition, whether to execute the target function that is indicated to be activated in the function configuration information, wherein the preset condition comprises whether carrier aggregation is supported by the terminal device,
   wherein a type of the terminal device is determined based on a business volume of the terminal device.

* * * * *